United States Patent [19]

Thomas et al.

[11] 4,197,832
[45] Apr. 15, 1980

[54] BAKING PAN INSULATOR

[76] Inventors: William J. Thomas; Doris Thomas, both of 7521 Otto St., Downey, Calif. 90240

[21] Appl. No.: 888,307

[22] Filed: Mar. 20, 1978

[51] Int. Cl.² .................... A47J 27/00; B65D 25/20
[52] U.S. Cl. .................................. 126/390; 220/400
[58] Field of Search ............ 220/1 R, 85 R, 452, 220/449, 468, 403, 408, 410, 400; 215/246; 426/128, 505, 523; 126/390, 373, 281; 99/447, 401, 433, 645, 646 C; 24/16 R, 17 A, 17 B, 31.2; 2/181, DIG. 11

[56] References Cited

U.S. PATENT DOCUMENTS

| 1,157,991 | 10/1915 | Linton | 126/390 |
| 1,345,750 | 7/1920 | Beaumont | 24/31 L X |
| 1,764,685 | 6/1930 | Kollman | 126/390 |
| 1,877,606 | 9/1932 | Shoemaker | 215/246 X |
| 1,974,186 | 9/1934 | Kollman | 126/390 |
| 1,997,769 | 4/1935 | Fletcher | 215/246 X |
| 2,201,779 | 5/1940 | Lathrop | 220/403 X |
| 2,462,728 | 2/1949 | Debs | 126/390 |
| 3,612,036 | 10/1971 | Kaufman | 99/447 X |
| 3,848,795 | 11/1974 | Bird et al. | 206/45.32 X |

OTHER PUBLICATIONS

*Decorating Cakes and Party Foods Baking Too* by Louise Spencer, Hearthside Press, Inc., Publisher, N.Y., N.Y., 1969, pp. 28, 29.

*Primary Examiner*—Allan N. Shoap
*Attorney, Agent, or Firm*—Edgar W. Averill, Jr.

[57] ABSTRACT

A device for insulating and cooling the sides of baking pans.

The device is a strip of water absorbent elastic material adapted to adhere to the outer surface of a baking pan. The material may be made into a ring, rectangle, or the like, smaller than the periphery of the baking pan.

1 Claim, 11 Drawing Figures

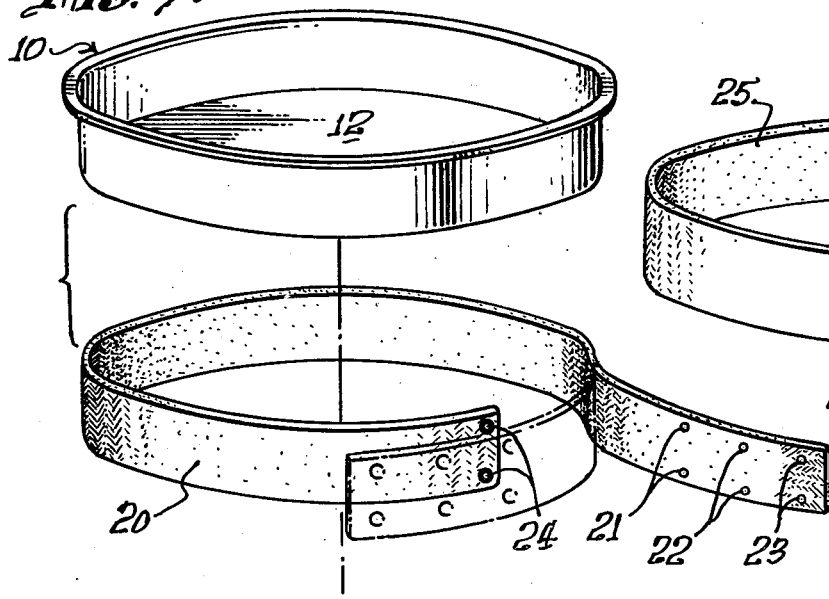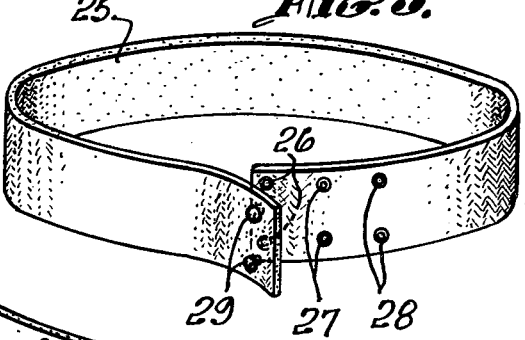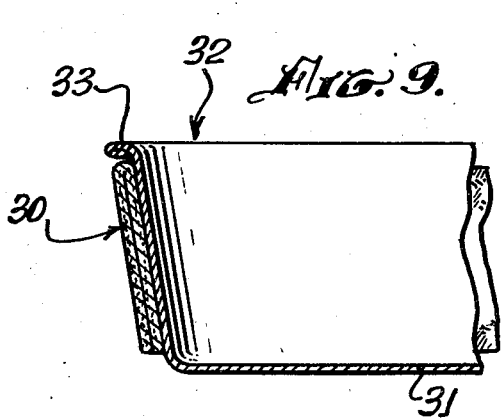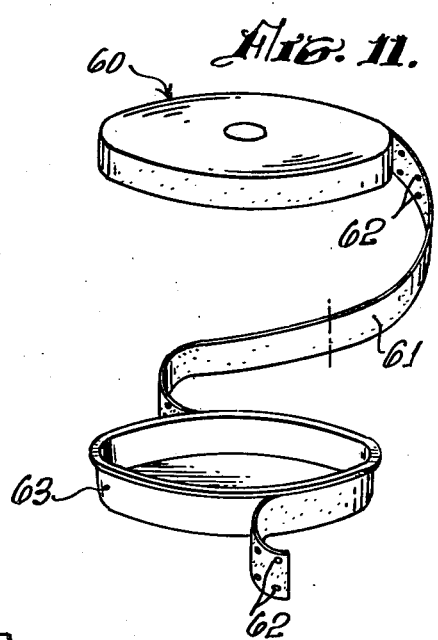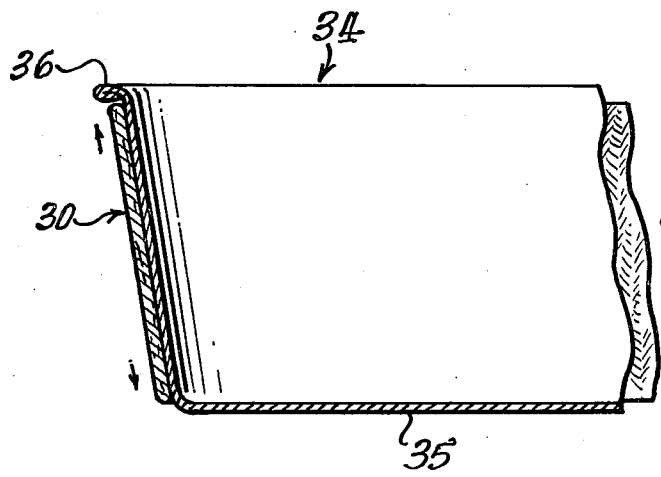

ated Mar. 20, 1978 as Ser. No. 888,308.

BAKING PAN INSULATOR

CROSS REFERENCE TO RELATED APPLICATIONS

This application is being filed on the same day as Applicant's Application for a BAKING PAN INSULATOR, filed Mar. 20, 1978 as Ser. No. 888,308.

BACKGROUND OF THE INVENTION

The field of the invention is baking utensils and the device relates more specifically to cake baking pans.

The tendency of a cake to rise non-uniformly during baking has been observed for centuries. The familiar dome in the center of the cake is inconvenient if the cake is to be user as a lower tier of a layer cake. It is common practice to slice the cake horizontally and remove the dome to improve the appearance of the cake and facilitate stacking and decorating the cake. It has also been noted that the finished cake is less uniform in texture adjacent the edge of the pan and a higher more uniformly baked product would be desirable.

It is believed that the doming or non-uniform rising of cakes results from the fact that the oven heat heats the side of the baking pan before any rising has taken place, and melts any exposed shortening which has been placed on the sides. Then as the cake rises, the batter tends to stick to the sides as a result of the absence of the shortening and to be baked too quickly at the sides compared to the center of the cake due to the excessive heat accumulated by the exposed sides of the baking pan.

It has been proposed that the insulation of the side walls of the baking pan with water will eliminate this non-uniform rising. A device for accomplishing this is shown in U.S. Pat. No. 3,946,893 where a layer of water is placed around the outer side walls of the baking pan and tends to cool the side walls of the pan during baking. Because of the cost of fabricating a double pan utensil of the type shown in U.S. Pat. No. 3,946,893 it is believed that such a device would not find widespread use outside of commercial bakers.

Another approach is set forth in a book entitled "Decorating Cakes and Party Foods Baking Too!" by Louise Spencer, Hearthside Press, Inc., Publishers, New York, Copyright 1969. This book suggests that strips of terrycloth be cut into strips about three times as wide as the depth of the pan. It then suggests that the strips be soaked in water and wrung out so that they are wet but not dripping. The book then directs that the wet strips be pinned tightly around the outside of the pan. This method has also not found widespread use because of the difficulty in performing the task, the likelihood of the strips slipping away from the sides of the pan, falling and causing a fire hazard and the lack of results in the event the strips do not contact or cling tightly to the sides of the pan during the baking process.

SUMMARY OF THE INVENTION

It is another object of the present invention to provide a device for reducing the tendency of a cake to rise non-uniformly.

The present invention is for a device which comprises a baking pan having a band of water absorbent material surrounding the outer surface thereof. The band may be made to cling to the outer side of the baking pan by forming it from an elastic ring of material which is soaked in water, wrung out to remove excessive water, and stretched around the outer periphery of the pan. The band may have provisions for being shortened so that the same band can be adapted to fit several sizes of pans. This method of shortening the band may comprise one or more pairs of snaps, hooks or other fasteners which may be permanently affixed to the band. The material from which the band is fabricated must be elastic if it is to be held to the sides of the pan by tensional force. Such material may be made by a double knit process which produces a fabric having a high degree of elasticity and bulkiness to absorb sufficient water to cool the sides of the pan during the baking process. The yarn should be heat resistant, water absorbent, hygienic, durable while wet, and suitable for woven or knitted fabrics.

BRIEF DESCRIPTION OF THE DRAWINGS

FIG. 7 is a perspective exploded view of the pan and an alternate form of fabricating the present invention.

FIG. 8 is a perspective view of an alternate embodiment of the band of the present invention.

FIG. 9 is a fragmentary cross-sectional side elevation of a portion of the material and pan of the present invention.

FIG. 10 is a fragmentary cross-sectional side elevation of a portion of the material and pan of the present invention.

FIG. 11 is a perspective view of the pan and band of material having adhesive thereon of the present invention.

DESCRIPTION OF THE PREFERRED EMBODIMENTS

A baking pan 10 has a side wall 11 and a bottom 12. The side wall 11 is surrounded by a band 13 which has been fabricated from a water absorbent elastic material.

Band 13 in addition to being water absorbent must be capable of withstanding the normal baking temperature such as 350° F. Because of its absorbency, heat conducting and durable qualities, cotton is an ideal yarn from which band 13 may be fabricated. By weaving the yarn by a double knit process, sufficient elasticity may be achieved in the material so that the fabricated band will adhere to the sides of the pan under tensional and frictional forces. Double knit fabrics are knitted with two sets of needles producing an interknitted double-layered fabric. The double-knitted cloth has very desirable properties and characteristics including durability, body and ability to cling to sides of the baking pan when stretched around the outer surface thereof. The elasticity of the double knitted fabric is not adversely affected by soaking in water, and thus because of its combination of properties double knit fabric is a preferred material of construction for the present invention. Furthermore, double knitted fabrics may be formed directly in a cylindrical shape as they are typically knitted on a circular double knitting machine. Alternatively they may be formed in desired widths and lengths on a flat knitting machine.

While cotton is an ideal yarn, other yarns having the ability to withstand 350° temperatures may also be used. It has been found that the yarn should advantageously be made from a material that is somewhat heat conductive since a certain degree of heat conduction by the material is necessary for the absorbed water to be effective in cooling the sides of the pan.

Band 13 is formed in a ring of continuous fabric. Such rings may be made directly by a double knit circular knitting machine. Double knitted fabric has the additional advantage of being highly elastic while at the same time not utilizing an elastic material which could be degraded by baking temperatures. The amount of elasticity forms an important aspect of the present invention if tensional force is to be the means for fastening the band securely around the outer surface of the baking pan. It is important that the fabric stretch sufficient to fit around the periphery of the pan and yet retain the ability to return to its smaller dimension. This characteristic of elasticity creates the necessary tension in the band causing it to adhere to the sides of the pan by frictional force.

For example, for an 8-inch diameter baking pan, the water soaked band 13 should have a relaxed diameter less than 8 inches in order to maintain enough elastic tension to hold on to the baking pan.

Figure 2:
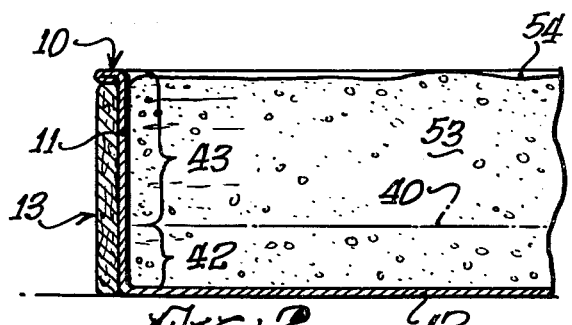
FIG. 2 is a cross-sectional fragmentary side elevation of the material and pan of the present invention.
Figure 3:
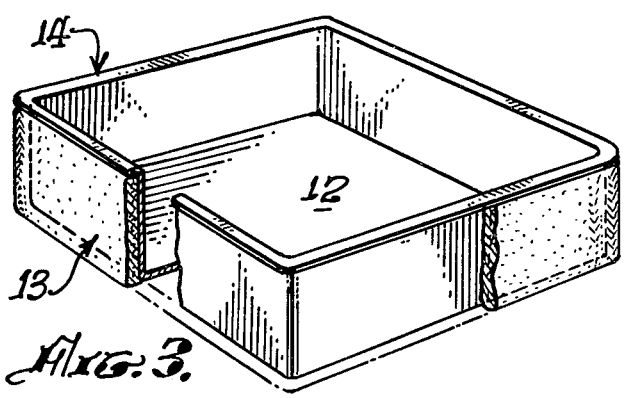
FIG. 3 is a perspective view partly broken away of the band of material of the present invention utilized on a rectangular baking pan.

In operation band 13 is soaked in water and wrung out, sufficient to avoid dripping. The water soaked band should contain sufficient water to cool the sides of the baking pan while the cake is rising. The actual amount of water to be retained by the band is dependent on baking temperature, size and heat conductivity of the baking pan and the desired texture of the outer edge of the finished baking product. For many typical baking operations the use of between 50 and 90 percent by weight of water is appropriate, with about 75 percent by weight of water being particularly useful. The soaked band is then stretched around the outer side wall 11 of pan 10, after which the pan is used in a conventional manner. A cross-sectional view of the band installed on the pan is shown in FIG. 2. Band 13 is installed on a rectangular pan 14 as shown in FIG. 3.

Figure 4:
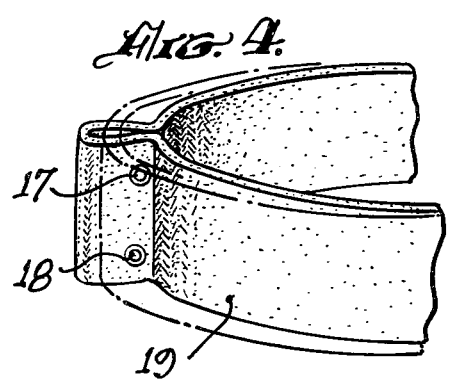
FIG. 4 is a fragmentary perpspective view of a portion of the band of material useful with the present invention.
Figure 5:
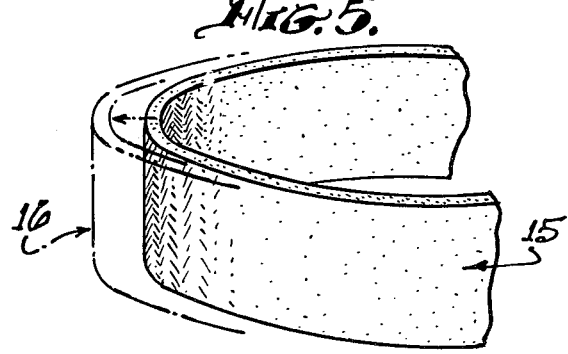
FIG. 5 is a fragmentary perspective view of the band of material useful with the present invention.

A band 15 made with double knitted fabric is shown in FIG. 5 with its stretched diameter 16 shown in phantom lines. In the event it is desired to further change the dimensions of the band beyond that possible with its inherent elasticity, a device or a pair of snaps such as snaps 17 and 18 may be added to band 19 as shown in FIG. 4. Band 19 should still be fabricated from an elastic fabric to provide the necessary holding force against the side of the baking pan. Two alternate snap arrangements are shown in FIG. 7 and 8. In FIG. 7 band 20 has three pairs of snaps 21, 22 and 23, each of which are capable of snapping to pair of snaps 24. Snap pairs 21, 22 and 23 would typically be placed at about three inch intervals to accommodate pans having diameter differences of one inch, since their circumferal difference is approximately three inches. The snaps may of course be positioned as shown in FIG. 8 where snap pairs 26, 27 and 28 mate with snap pair 29, all affixed to band 25.

Figure 1:
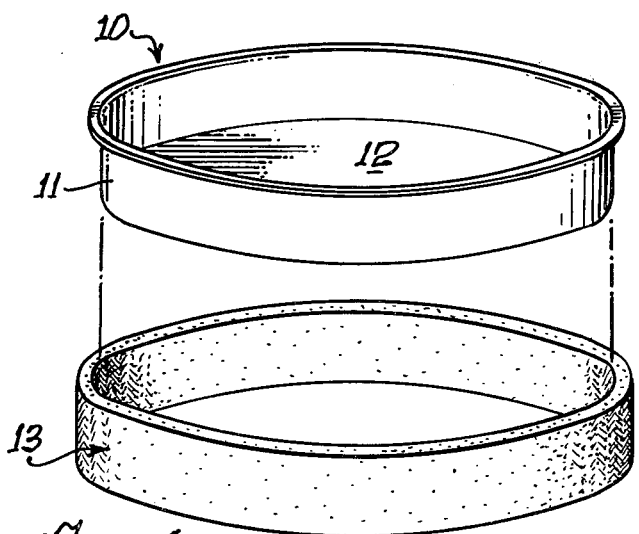
FIG. 1 is a perspective view of the pan and band of material of the present invention.

The width of the band should be sufficient to extend from the bottom of the pan to the upper lip. As shown in FIG. 9, band 30 has been folded once over and extends from approximately the bottom 31 of shallow pan 32 to the upper lip 33. It is important to note that bands made according to the described invention will be held by tension and frictional forces of the elastic fabric onto pans having sloped sides such as that shown in FIG. 9, as well as on circular and rectangular pans, such as those shown in FIGS. 1 and 3.

As shown in FIG. 9, band 30 has been folded over once and in this way a band of one width may be used on both shallow pans such as shown in FIG. 9 or deep pans such as shown in FIG. 10, where the same band 30 is placed around the circumference of deep pan 34 and stretched to extend from the bottom 35 to the upper lip 36.

Figure 6:
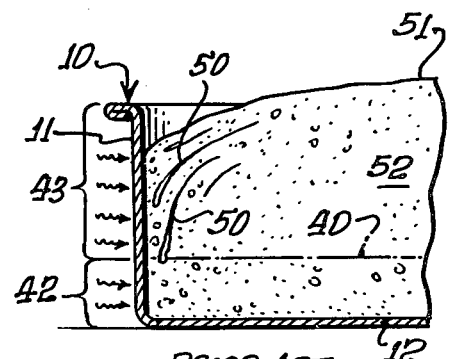
FIG. 6 is a fragmentary cross-sectional side elevation of a prior art pan.

The operation of the present invention is shown best by a comparison of FIGS. 2 and 6. Both figures show the same pan 10 and the same level of batter 40. After the batter has been added, wall 11 has a lower portion 42 which contacts the cool batter and an exposed portion 43 which is open on both sides to the oven heat. The inner side of wall 11 is typically coated with shortening prior to the addition of the batter. When the typical unprotected pan is placed in the oven, the unprotected portion 43 of the sidewall 11 absorbs heat from the oven air and the shortening melts from the inner wall and is largely removed therefrom. As the cake begins to rise, that portion of the cake batter which touches the inner surface of sidewall 11 is substantially hotter than the other portions of the cake batter which are removed from the sidewall. This results in non-uniform baking and distortions such as those indicated by reference character 50. The cake 52 thus has a crown 51 which has the disadvantage as set forth above. In contrast, the pan shown in FIG. 2 is protected by band 13 which has been soaked in water and has about 75 percent by weight of water based on the total weight of the band plus water. The upper portion 43 of sidewall 11 instead of being heated to the oven temperature, is kept at a cooler temperature by the evaporation of the absorbed water in band 13. Thus the portion of the batter near the sides of the pan is not overheated and the distortions such as distortions 50 of FIG. 6 are not present. Similarly, cake 53 has an essentially level upper surface 54 without the necessity of having to cut off any portion of the cake. The resulting sides of the cake also have been found to rise to a higher level than the same cake in an unbanded pan. The combined cooling and insulative effect of band 13 results in a cake which is baked uniformly throughout without an overcooked outer edge. The resulting cake is ideal for making into a layer cake without the tendency to break or crack across the top, which often happens with a highly crowned cake.

The band of the present invention can be reused many times, since it is not harmed by the baking process. A single band is capable of being used on circular, rectangular and other shapes of pans, and adheres to pans both with vertical and slanted sides. By being stretched vertically or folded over, the band may be placed from the upper lip of the pan to the bottom.

An alternate embodiment of the present invention is desribed in applicant's copending application Ser. No. 888,308, filed Mar. 20, 1978, shown in FIG. 11 where a supply roll 60 fabricated from heavy paper 61 has an adhesive such as adhesive dots 62 affixed to one side thereof. The heavy paper is wrapped around the exterior of pan 63 after being soaked in water. Paper 61 is held to the side of the pan by the adhesive which preferably should be a delayed tack adhesive capable of withstanding moisture and baking temperatures. By the use of this embodiment, the absorbent band may be supplied in a roll such as supply roll 60 and would typically be disposable after one use, although it could be reused as long as it remained intact. The paper should be heavy enough or wrapped with several layers to hold sufficient water depending upon the baking temperature, size of the baking pan and the desired texture of the baked product.

While the present invention has been described as useful for the baking of cakes, it is, of course, useful for other baked products such as rolls, bread and the like.

The present embodiment of this invention are thus to be considered in all respects as illustrative and not restrictive, the scope of the invention being indicated by the appended claims rather than by the foregoing description. All changes which come within the meaning and range of equivalency of the claims therefore are intended to be embraced therein.

What is claimed is:

1. A device for reducing the tendency of the sides of a cake to rise non-uniformly with the top of the cake during baking, said device comprising:
   a baking pan;
   a water absorbent band of material, said band surrounding the outer surface of said baking pan, said band being capable of holding sufficient water to cool the sides of said pan during baking, said band being formed in a unitary ring and further being elastically stretchable to maintain tension against said outer surface;
   at least one pair of snap means affixed to said water absorbent band and each element of the pair being positioned about three inches apart from each other, said pair of snap means comprising a male half and a female half positioned on the outer surface of the band whereby when said halves are joined a loop is formed in the band and the effective peripheral size of the band is reduced; and
   said ring in its relaxed configuration detached from said pan being smaller in periphery than the periphery of said baking pan.

* * * * *